US009599636B2

(12) United States Patent
Humphris

(10) Patent No.: US 9,599,636 B2
(45) Date of Patent: Mar. 21, 2017

(54) PROBE MICROSCOPE WITH PROBE MOVEMENT FROM HEATING

(71) Applicant: INFINITESIMA LIMITED, Abingdon (GB)

(72) Inventor: Andrew Humphris, Abingdon (GB)

(73) Assignee: INFINITESIMA LIMITED, Abingdon (GB)

( * ) Notice: Subject to any disclaimer, the term of this patent is extended or adjusted under 35 U.S.C. 154(b) by 0 days.

(21) Appl. No.: 14/905,378

(22) PCT Filed: Jul. 18, 2014

(86) PCT No.: PCT/GB2014/052196
§ 371 (c)(1),
(2) Date: Jan. 15, 2016

(87) PCT Pub. No.: WO2015/011448
PCT Pub. Date: Jan. 29, 2015

(65) Prior Publication Data
US 2016/0154022 A1   Jun. 2, 2016

(30) Foreign Application Priority Data

Jul. 22, 2013 (GB) .................................. 1313064.6

(51) Int. Cl.
*G01Q 10/06* (2010.01)
*G01Q 10/00* (2010.01)
*G01Q 20/00* (2010.01)

(52) U.S. Cl.
CPC ........... *G01Q 10/00* (2013.01); *G01Q 10/065* (2013.01); *G01Q 20/00* (2013.01)

(58) Field of Classification Search
CPC ........ G01Q 60/34; G01Q 10/04; G01Q 10/06; G01Q 10/065

(Continued)

(56) References Cited

U.S. PATENT DOCUMENTS

| 5,324,935 A | 6/1994 | Yasutake |
| 2002/0062684 A1* | 5/2002 | Adderton ............... B82Y 35/00 73/105 |

(Continued)

FOREIGN PATENT DOCUMENTS

| WO | 02063368 A1 | 8/2002 |
| WO | 2004005844 A2 | 1/2004 |
| WO | 2012104625 A1 | 8/2012 |

OTHER PUBLICATIONS

"Micromachined atomic force microscopy sensor with integrated piezoresistive sensor and thermal bimorph actuator for high-speed tapping-mode atomic force microscopy phase-imaging in higher eigenmodes" Pedrak, R. et al. J. Vac. Sci. Technol. B 21, 3102 (2003).*

(Continued)

*Primary Examiner* — Brooke Purinton
(74) *Attorney, Agent, or Firm* — Hauptman Ham, LLP

(57) ABSTRACT

A scanning probe microscope comprising: a signal generator providing a drive signal for an actuator to move a probe repeatedly towards and away from a sample. In response to the detection of an interaction of the probe with the sample the drive signal is modified to cause the probe to move away from the sample. The drive signal comprises an approach phase in which an intensity of the drive signal increases to a maximum value; and a retract phase in which the intensity of the drive signal reduces from the maximum value to a minimum value in response to the detection of the surface position. The intensity of the drive signal is held at the minimum value during the retract phase and then increased at the end of the retract phase. The duration of the retract phase is dependent on the maximum value in the approach phase.

20 Claims, 11 Drawing Sheets

(58) Field of Classification Search
USPC .......................................................... 850/3, 4
See application file for complete search history.

(56) References Cited

U.S. PATENT DOCUMENTS

| | | |
|---|---|---|
| 2002/0089339 A1 | 7/2002 | Murayama |
| 2004/0051542 A1 | 3/2004 | Miles et al. |
| 2008/0223117 A1 | 9/2008 | Watanabe et al. |
| 2011/0247106 A1* | 10/2011 | Humphris ............... B82Y 35/00 850/6 |
| 2014/0026263 A1 | 1/2014 | Humphris |

OTHER PUBLICATIONS

Akiyama et al., "Fast driving technique for integrated thermal bimorph actuator toward high-throughput atomic-force microscopy" Review of Scientific Instruments 73, 2643 (2002); doi: 10.1063/1.1488148.*

International Search Report and Written Opinion for International Application No. PCT/GB2014/052196 mailed Aug. 14, 2014.

UKIPO Search Report in GB Application No. 1313064.6, dated Jan. 6, 2014.

Dai et al., "Development of a 3D-AFM for true 3D measurements of nanostructures", Measurement Science and Teclmology (2011), vol. 22, p. 094009 (10 pp).

Liu et al., "Calibration of measurement sensitivities of multiple micro-cantilever dynamic modes in atomic force microscopy using a contact detection method", Review of Scientific Instruments (2013), vol. 84, pp. 23703 (9 pp).

* cited by examiner

PROBE MICROSCOPE WITH PROBE MOVEMENT FROM HEATING

RELATED APPLICATIONS

The present application is a National Phase of International Application Number PCT/GB2014/052196, filed Jul. 18, 2014, and claims priority from Great Britain Application Number 1313064.6, filed Jul. 22, 2013.

This invention relates to the field of probe microscopy and, in particular, to a novel mode of operation of a microscope that utilises a probe which moves repeatedly towards and away from a sample.

The principle behind the scanning probe microscope (SPM) is to obtain a map or image of a sample surface by monitoring the interaction between the sample surface and a probe tip that is positioned in close proximity. By mechanically scanning the tip over the sample surface, data characterising the interaction over an area of interest may be collected and a map or image generated.

A particular example of an SPM is the atomic force microscope (AFM) in which the force interaction between the sample and the sharp tip of a probe is monitored. The probe of a typical AFM includes a small cantilever that is fixed to a support at its base and with the tip at its opposite (free) end. When the probe tip is brought into close proximity with the sample, an interaction force develops between sample and tip. If the tip is in motion, for example oscillating, the interaction force will modify this motion in some way. If the tip is static, the force will displace the tip relative to the sample surface.

During the course of a scan, the tip is moved over the area of the sample to be characterised. A three axis (xyz) high-resolution scanner typically generates relative motion between the sample and the probe, driving either the sample and/or probe support. The scanner may be a single integrated unit or it may comprise separate actuators or groups of actuators. For example, some AFMs employ a combined x, y direction actuator to move the sample and a separate z actuator to move the probe. Conventionally, the xy plane is taken to correspond generally with that of the sample and the z or vertical direction is taken to be that in which the separation between probe and sample may be adjusted.

Scanners typically employ piezoelectric stack or tube actuators. These actuators are based on a voltage applied to a piezoelectric material to generate movement, which may be guided using mechanical flexures. Alternative scanners, such as those described in WO02/063368 and WO2004/005844, utilise the motion of a mechanically resonating structure to generate one or more components of the xy scan.

The effect of the interaction force on either the position and/or motion of the probe tip is monitored during the course of the scan. In conventional contact-mode AFM operation, the monitored interaction force is held constant. That is, its effect on the probe is observed and a feedback system operates to adjust the separation of the sample and the base of the cantilever in response to any change so as to return the observed parameter to a predetermined value: the set point of the feedback system. Data associated with this adjustment (conventionally, vertical or "z" movement) is collected and may be used to construct a map or image of the sample across a region of its surface.

The interpretation of the image formed by the AFM will depend to some extent on the nature of the surface under investigation. Surface topography generally makes the most significant contribution to the image, the height of the sample being closely followed by the probe as it scans, but other characteristics such as surface hydrophobicity and hydrophilicity, viscoelasticity, etc. may also contribute. The probe and microscope may further be adapted to measure other sample properties, such as magnetic or electric fields, via suitable interaction forces.

AFMs may be designed to operate in a variety of imaging modes. In contact mode the probe continuously remains in close proximity with the sample. In dynamic (or non-contact) mode the probe is oscillated, usually at a resonant frequency of the cantilever in the flexural or torsional modes.

If a static tip is used to characterise the surface, such as in contact mode, then changes in the interaction force are monitored during the course of a scan via the bending or deflection of the cantilever. As the interaction force between tip and surface changes, the tip is urged either towards or away from the surface which causes the cantilever part of the probe to bend or flex along its length.

The deflection of the cantilever is typically monitored with an optical lever system. Deflection, in this context, refers to the tilt of an upper surface of the cantilever, which is used by the AFM to provide an indication of cantilever bend. A light beam is directed towards the upper surface of the cantilever, above the tip, and reflected towards a position sensitive detector such as a split or quadrant photodiode. Many sources may be used to generate the light beam. Typically, a laser diode emitting visible or infrared radiation is used. Alternatively, a He Ne laser, superluminescent diode (SLD), LED or other light source whose emitted beam is capable of being collimated and/or focused to a spot may be used.

Alternatively, the AFM may be operated in a dynamic mode. The probe is oscillated, often at or near one of its resonant frequencies, and variations in the sample—probe interaction affect the motion of the probe. In particular, the amplitude, phase and frequency of these oscillations may be monitored and probe—sample separation adjusted in order to maintain constant average interaction.

The use of an oscillating probe means that the probe is only intermittently brought into close proximity with the sample. This has the effect of reducing lateral forces between tip and sample surface. In contact mode lateral forces developed as the probe is moved across the surface may, if imaging soft materials such as biological samples or polymers, destroy the sample surface. Any measurements taken will be rendered meaningless, or at least relate to a deformed surface. These lateral forces may also be destructive of a fragile probe tip. An example of a fragile tip is one with a high aspect ratio i.e. one with a long length relative to its width that is used to probe narrow trenches in sample surfaces. In addition an AFM operating in a dynamic mode is often capable of extracting more material-specific information.

It can be seen that the AFM can be configured and used in many different modes. It should be borne in mind that the above description of contact and dynamic modes and of atomic force microscopy is to provide a general introduction to the field of probe microscopy and is not intended to imply any limitation to the field of application of this present invention in any way.

Regardless of their mode of operation, AFMs can be used to obtain images on an atomic scale of a wide variety of samples, insulating and conducting, in a range of environments, air, liquid or vacuum. Typically, they employ piezoelectric actuators, optical lever deflection detectors and very small cantilevers produced using silicon fabrication techniques. Their high resolution and versatility has led to their finding application in diverse fields such as industrial inspection, semiconductor manufacturing, biological research, materials science and nanolithography.

A first aspect of the present invention provides a scanning probe microscope comprising: a probe that is mechanically responsive to a driving force; a signal generator for providing a drive signal to an actuator that generates the driving force by heating the probe, the drive signal being such as to cause the actuator to move the probe repeatedly towards and away from a sample; a detection system arranged to output a detection signal indicative of a position of the probe; and signal processing apparatus arranged to monitor the probe as the probe approaches the sample and to detect a surface position at which the probe interacts with the sample; wherein in response to detection of the surface position the signal processing apparatus prompts the signal generator to modify the drive signal to cause the probe to move away from the sample.

The signal generator is arranged so that the drive signal comprises a series of cycles, each cycle comprising an approach phase in which an intensity of the drive signal increases to a maximum value to heat the probe and cause it to move towards the sample; and a retract phase after the approach phase in which the intensity of the drive signal reduces from the maximum value to a minimum value in response to the detection of the surface position so that the probe cools and moves away from the sample.

The signal generator is further arranged so that the intensity of the drive signal is held at the minimum value during the retract phase and then increased at the end of the retract phase.

The signal generator is further arranged so that the duration of the retract phase for each cycle is dependent on the maximum value in the approach phase of that cycle so that a high maximum value is associated with a long retract phase and a low maximum value is associated with a short retract phase.

A further aspect of the invention provides a method of examining a sample, the method comprising the steps of: generating a drive signal that is used to drive a probe repeatedly towards and away from the sample; measuring a position of the probe to generate a detection signal; monitoring the probe as the probe approaches the sample to obtain an indication of a surface position at which the probe interacts with the sample; and adjusting the drive signal in response to the indication of surface position. The drive signal comprises a series of cycles, each cycle comprising an approach phase in which an intensity of the drive signal increases to a maximum value to heat the probe and cause it to move towards the sample; and a retract phase after the approach phase in which the intensity of the drive signal reduces from the maximum value to a minimum value in response to the indication of the surface position so that the probe cools and moves away from the sample. The intensity of the drive signal is held at the minimum value during the retract phase and then increased at the end of the retract phase. The duration of the retract phase for each cycle is dependent on the maximum value in the approach phase of that cycle so that a high maximum value is associated with a long retract phase and a low maximum value is associated with a short retract phase.

A further aspect of the invention provides a scanning probe microscope comprising: a probe that is mechanically responsive to a driving force; a signal generator for providing a drive signal to an actuator that generates the driving force by heating the probe, the drive signal being such as to cause the actuator to move the probe repeatedly towards and away from a sample; a detection system arranged to output a detection signal indicative of a position of the probe; and signal processing apparatus arranged to monitor the probe as the probe approaches the sample and to detect a surface position at which the probe interacts with the sample; wherein in response to detection of the surface position the signal processing apparatus prompts the signal generator to modify the drive signal to cause the probe to move away from the sample. The signal generator is arranged so that the drive signal comprises a series of cycles, each cycle comprising an approach phase in which an intensity of the drive signal increases to a maximum value to heat the probe and cause the probe to move towards the sample; and a retract phase after the approach phase in which the intensity of the drive signal reduces from the maximum value to a minimum value in response to the detection of the surface position so that the probe cools and moves away from the sample. The signal generator is further arranged so that the intensity of the drive signal is held at the minimum value during the retract phase and then increased at the end of the retract phase. The signal generator is further arranged so that each cycle further comprises a hold phase after the retract phase in which the intensity of the drive signal is held at an intermediate value between the minimum value and the maximum value.

In the various aspects of the invention the intensity of the drive signal may increase and decrease during the approach and retract phase in a continuous or analog fashion. Alternatively the drive signal may comprise a series of "ON" pulses separated by periods of zero (or lowered) intensity, and the intensity of the drive signal is controlled by pulse-width modulation—that is, by varying the duration of the "ON" pulses. Therefore the term "intensity of the drive signal" is to be interpreted as either the instantaneous intensity of the drive signal, or the average intensity of the drive signal (in the case of a pulse-width modulated drive signal).

Prior art SPMs are known to implement a z position feedback system, which serves to move the base of the cantilever or otherwise to maintain average interaction of the probe with the surface of a sample. In the case of a typical AFM operating in a dynamic mode the probe is oscillated with a constant amplitude and frequency drive signal. In contrast, the present invention modifies the motion of the probe directly via its drive signal, typically on a pixel by pixel basis. The prior art dynamic mode AFM can be considered to modify the probe oscillatory motion in so far as the z position feedback system attempts to maintain oscillation frequency, phase or amplitude at its set point. This prior art modification is however achieved by changing the separation between probe and sample, rather than via its drive signal. The present invention offers a more flexible system in which the probe motion is not merely maintained but adapted in response to characteristics of the sample being imaged. This concept is referred to below as "adaptive drive". The probe motion may be implemented with or independent of another z position adjustment system, which may operate by adding an offset to the drive signal or by operation of another actuation mechanism.

The surface position is a position at which the probe interacts with the sample, and is typically a position where the probe can be considered to have made contact with the sample or be proximate the sample.

The signal processing apparatus typically prompts the signal generator to modify the drive signal on detection of the surface position (that is immediately after detection of the surface position, or soon after detection of the surface position and before the next repeat of the drive signal cycle).

Typically the drive signal typically has an un-modified waveform with a free-space amplitude which it would follow in the absence of detection of the surface position (that is, in free space in the absence of a sample) and the amplitude of the drive signal is reduced from this free-space value in response to detection of the surface position.

The actuator may comprise an illuminator or other heating mechanism which heats a thermal bimorph probe causing the probe to move by deflecting (that is by flexing along its length).

Where the probe deflects then the surface position may be detected by monitoring a deflection signal which is indicative of a deflection or tilt angle of the probe, for instance by means of an optical lever system. Thus in this example the microscope may operate an interferometer-based height detector to generate the height signal from which the image is derived; and a separate deflection detector which generates a deflection signal which is used to detect the surface position. In a second example the surface position may be detected by monitoring the height signal, enabling the surface position to be detected whether or not the probe deflects as it moves. Thus in this second example the height signal is used for two purposes: to detect the surface position and (directly or indirectly) to form the image.

The detection system is typically arranged to output a height signal indicative of a path difference between light reflected from the probe and a height reference beam, which is typically also a light beam. Typically the height signal is indicative of a height of the probe relative to a stage on which the sample is mounted.

The height reference beam may be a reflected beam from a reference point that is in known relationship with sample position, and the detection system is preferably an interferometer.

The detection signal may be used in a number of ways—for instance it may be used by image processing apparatus to form an image. For example the image of the sample may comprise a plurality of pixels, each pixel varying in accordance with the value of the detection signal when the surface position is detected for a given single cycle of the motion of the probe towards and away from the sample. Alternatively each pixel of the image may be derived from plural data samples collected from the position signal over an extended portion of the probe motion during a single cycle of its motion, rather than from a single data sample for each cycle. For example plural data samples may be collected for an extended portion of the probe motion before and/or after the surface position is detected, and these samples analysed to determine the value of a material property (such as elasticity) and that material property used as a pixel of the image. In this way an image or map of the material property across the sample can be formed.

The image typically comprises a plurality of pixels, which may be arranged in a single row or a plurality of rows, and are preferably (but not necessarily) arranged in a regular array. The pixels may be spaced close together, or may be spaced sparsely.

The pixels may simply show the height of the sample at various locations, or they may show some other property of the sample such as its elasticity or some other material property.

Typically each pixel is derived from one or more data samples which are taken from the detection signal during only a single cycle of the motion of the probe towards and away from the sample. For example each pixel may vary in accordance with the detection signal at the time that the surface position has been detected by the signal processing apparatus for a particular cycle.

The signal processing apparatus is ideally arranged to monitor the rate of change of a position signal (which may be the detection signal or some other signal) and to obtain the indication of surface position from the position signal obtained at a point in time at which the rate of change of the position signal is below a preset threshold level for a preset time interval.

The drive signal causes the actuator to move the probe repeatedly towards and away from the sample between a fully retracted position and a surface position. Typically the signal processing apparatus is also arranged to adjust a separation of the probe and sample so as to maintain the distance between the surface position and the fully retracted position at a predetermined value. This adjustment might be achieved by monitoring the motion of the probe, for example using the amplitude of the height signal over one or more cycles. Alternatively the adjustment might be achieved by detecting the magnitude of the drive signal at the time that the surface position is detected. Typically the separation is adjusted over the course of two or more cycles so as to maintain the average distance between the surface position and the fully retracted position at a desired value. This separation may be adjusted by a separate actuator, such as a piezoelectric driver operable to move the probe and sample towards and away from each other over ranges larger than that achievable by the cyclic drive of the probe. Alternatively the separation may be adjusted by the same actuator which drives the probe towards and away from the sample. Typically the predetermined value is about half the free-space amplitude (that is, the amplitude between the two extreme points of the motion of the probe in the absence of a sample).

Optionally the microscope may further comprise: a further signal generator for providing a second drive signal to said actuator or to a second actuator, the second drive signal being such as to cause said actuator or said second actuator to excite one or more secondary oscillations of the probe. The signal processing apparatus comprises a surface interaction detector arranged to generate an interaction signal indicative of the amplitude, phase or frequency of the secondary oscillations of the probe (for instance by monitoring the detection signal, or using a second detection system such as a deflection detector) and the signal processing apparatus is arranged to detect the surface position by monitoring the interaction signal as the probe approaches a sample. The second drive signal is ideally arranged to operate at a resonant frequency of one or more flexural or torsional modes of the cantilever, and the proximity detector is ideally arranged to include a dynamic tip-sample interaction detection system. Optionally the probe is illuminated at a first location by the first actuator and at a second location by the second actuator, in order to drive the probe by the photothermal effect.

Typically the drive signal comprises a series of drive pulses. Preferably each pulse is a ramp or monotonically increasing waveform which drives the probe towards the surface, followed by a ramp or monotonically decreasing waveform which drives the probe away from the surface.

Optionally the drive signal comprises a series of drive pulses, wherein at least some of the drive pulses are separated from the next drive pulse by a waiting period during which the drive signal remains substantially constant.

Embodiments of the invention will now be described by way of example only and with reference to the accompanying drawings.

FIGS. 3(a) and 3(b) are graphs showing respectively examples of an ideal drive signal to the cantilever and the cantilever response in a system in accordance with this invention.

FIGS. 4(a), 4(b) and 4(c) are diagrams illustrating respectively at equivalent time intervals: probe movement in relation to sample surface, intensity of the probe drive signal and amplitude of the Z piezoelectric drive signal that maintains an average probe height.

Figure 5:
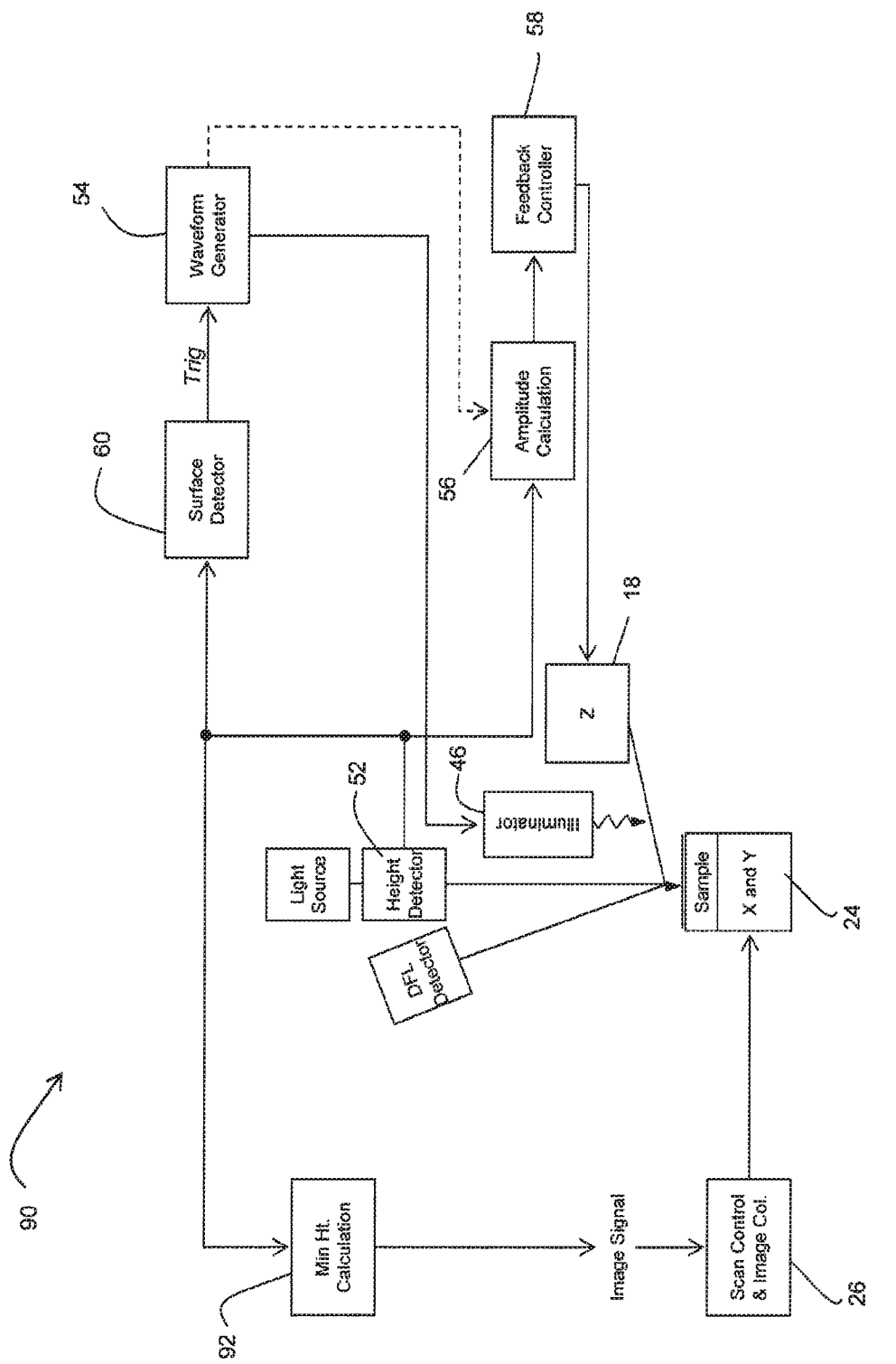

FIG. 5 is a schematic illustration of a scanning probe microscope incorporating a cantilever drive system in accordance with a second embodiment of the present invention.

Figure 6:
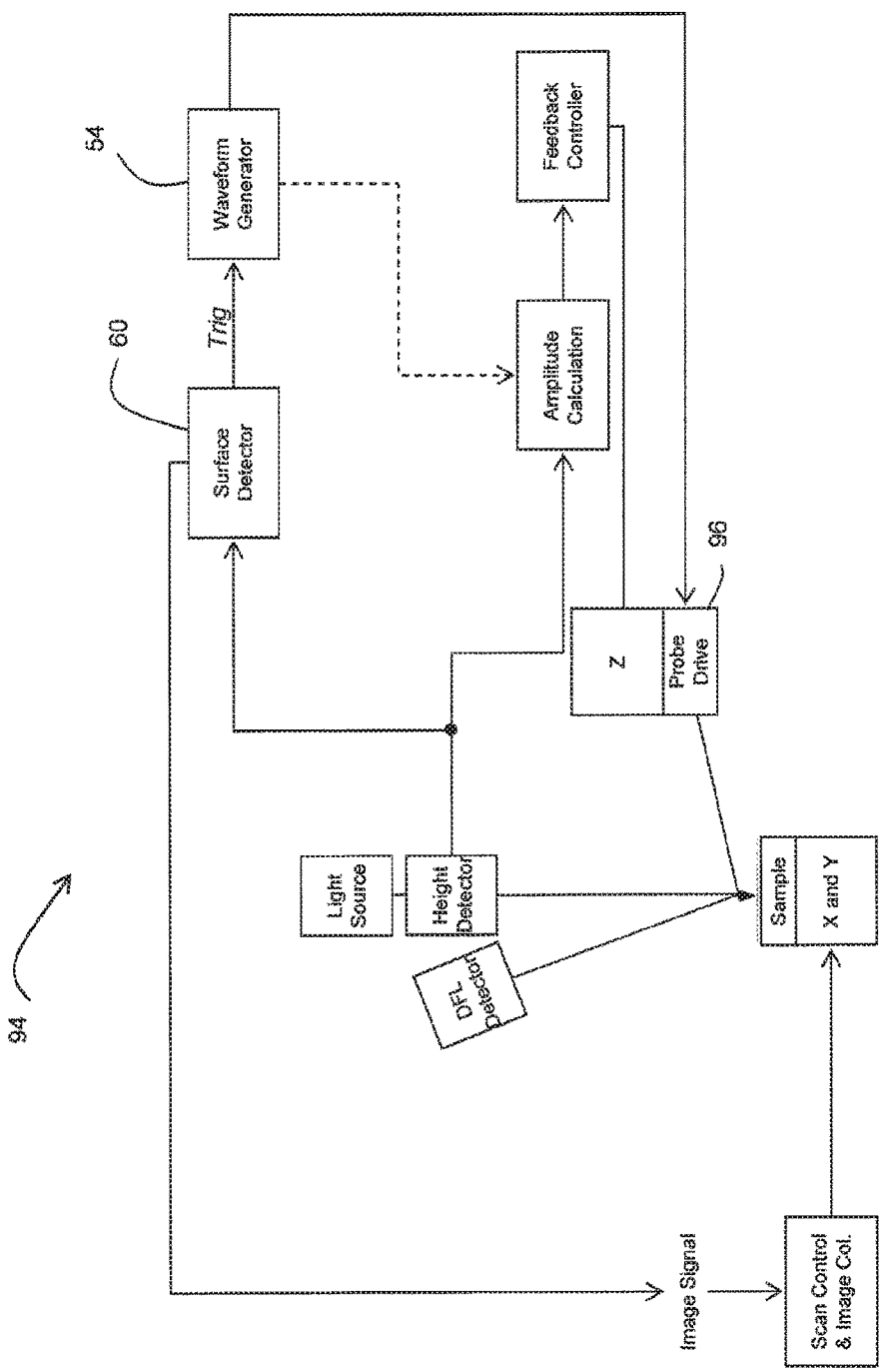

FIG. 6 is a schematic illustration of a probe microscope incorporating a cantilever drive system in accordance with a third embodiment of the present invention.

Figure 7:
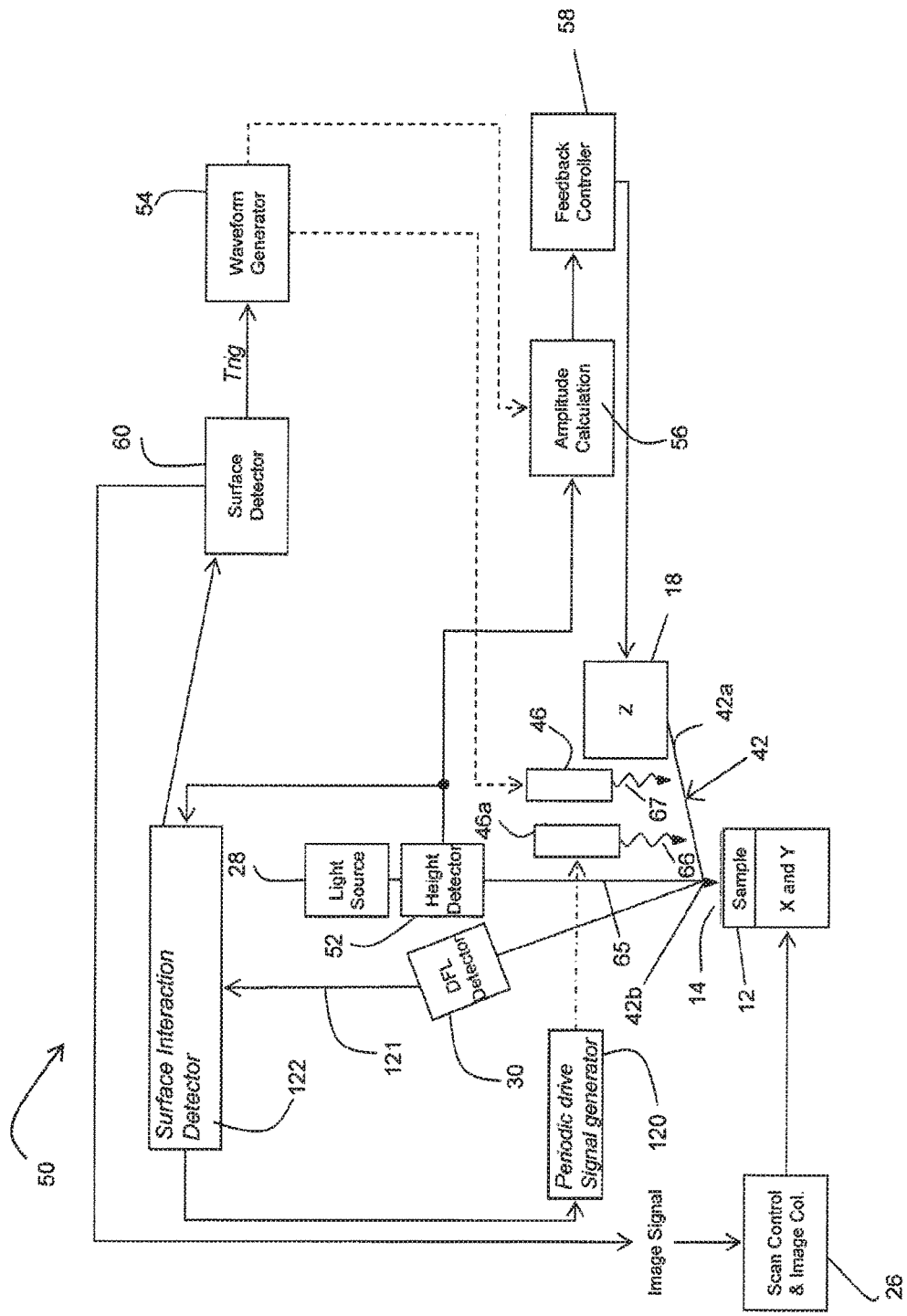

FIG. 7 is a schematic illustration of a probe microscope incorporating a cantilever drive system in accordance with a fourth embodiment of the present invention.

FIGS. 8(a) and 8(b) show the intensity of the drive signal in the case of a symmetrical drive signal and an alternative asymmetrical drive signal.

Figure 9:
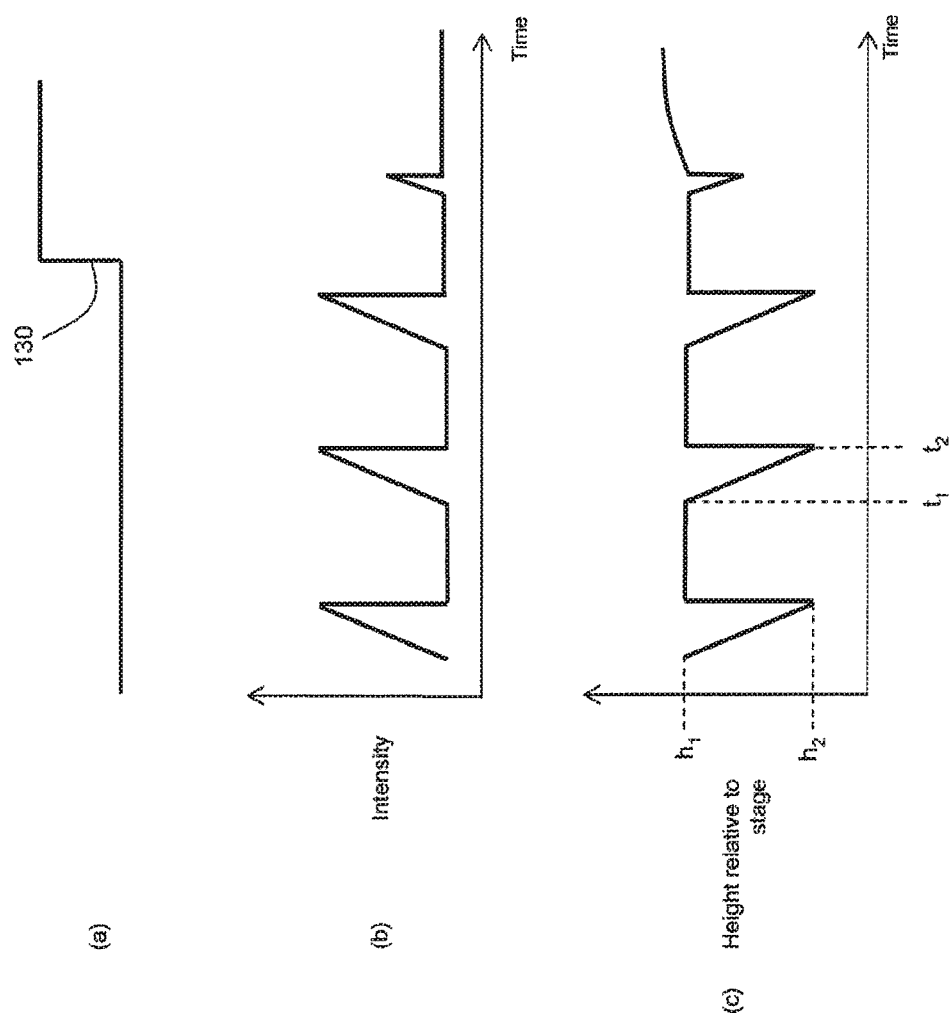

FIG. 9 shows at (a) the profile of a sample with a step, at (b) the intensity of the drive signal, and at (c) the output of the height detector.

Figure 10:
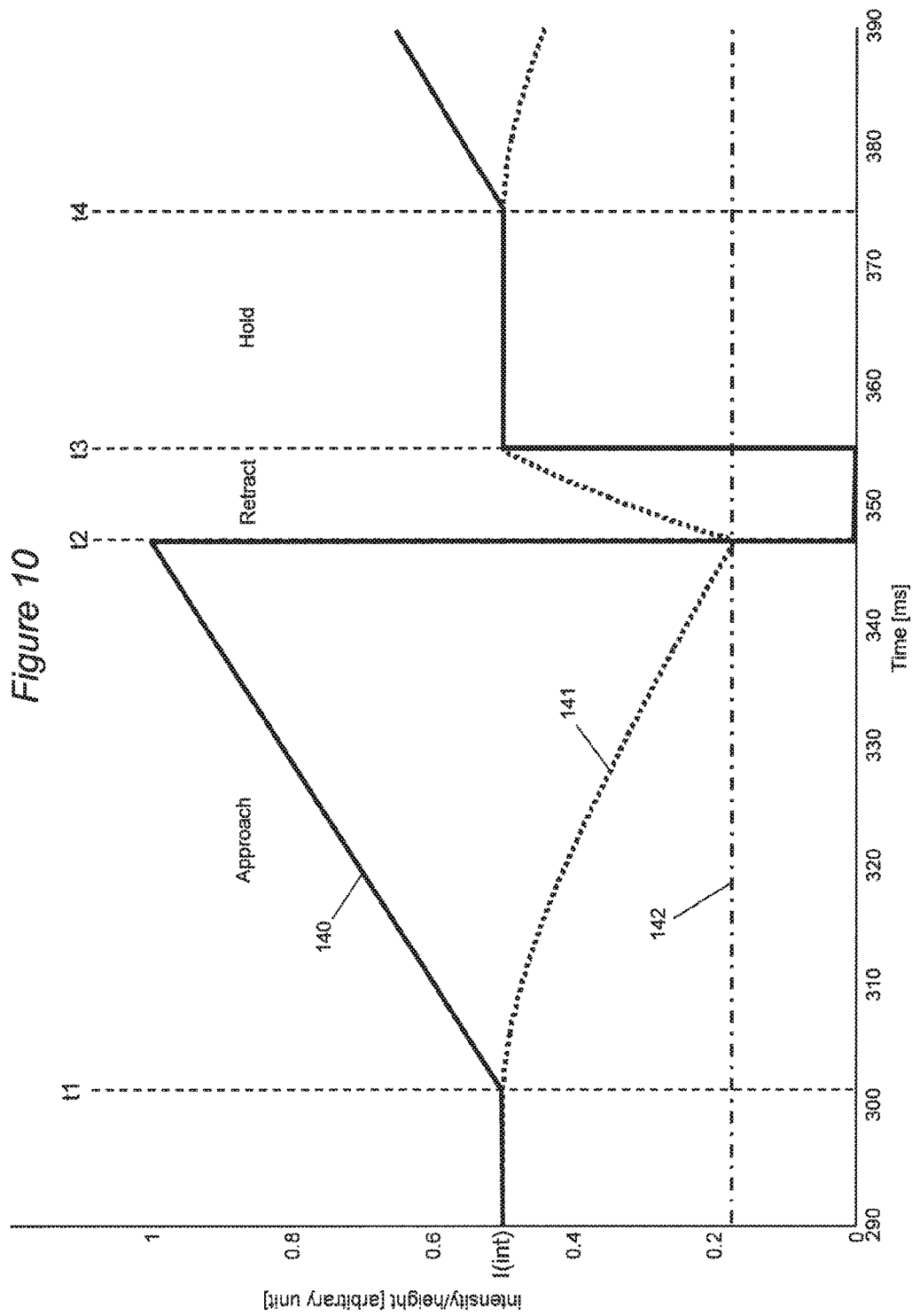

FIG. 10 is a graph showing the intensity of the drive signal for a single cycle of a drive method according to an embodiment of the present invention.

FIG. 11(a) shows the profile of a sample.

FIGS. 11(b)-11(d) show three alternative drive signals.

Figure 1:
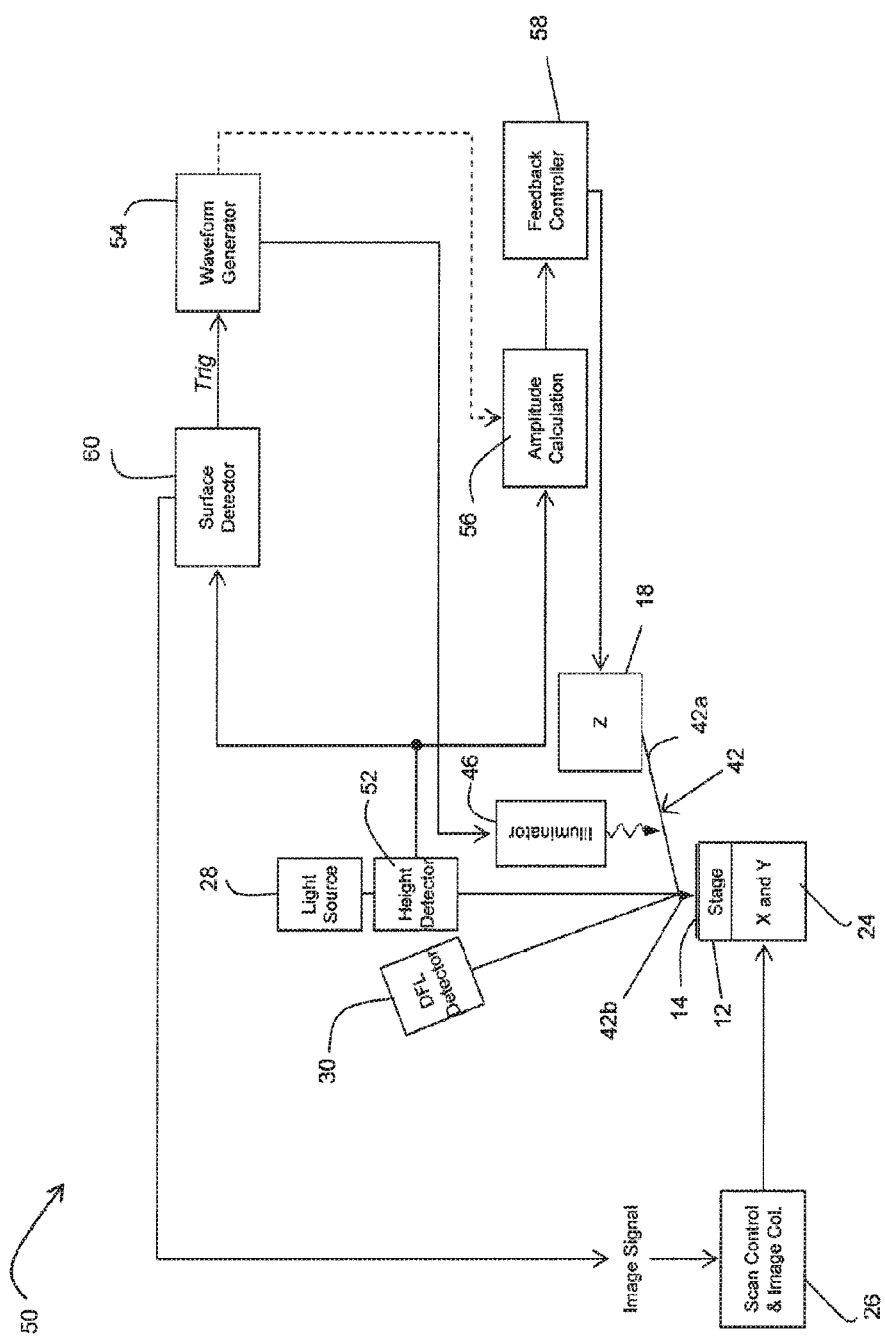
FIG. 1 is a schematic illustration of a probe microscope incorporating a cantilever drive system in accordance with the present invention.

FIG. 1 shows a probe microscope 50 configured to operate with a direct height detection system. The microscope 50 comprises a moveable stage 12 adapted to receive a sample 14, whose surface is to be investigated by a thermal bimorph probe 42. The scanning capability is provided by two conventional drive systems: x,y scanners 24 are operable by a scan controller 26 to provide relative motion of the probe in the plane (x, y) of the sample; a z positioning system 18 comprising piezoelectric drivers is operable to move the probe and sample towards and away from each other (z direction) over ranges larger than that achievable by the cyclic drive of the probe.

The probe 42 comprises a cantilever beam 42a and a tip 42b, which tapers to a point, and which is located towards a distal end of the cantilever beam 42a. The other (base or proximal) end of the cantilever beam 42a is supported by a mount. In this embodiment, the z-positioning system 18 is connected to the probe mount. Alternatively, it may be connected to the sample stage 12.

The probe tip 42b comprises a three dimensional, often conical or pyramidal structure that is located at the free end of the cantilever beam. The tip tapers to a point that is its closest point of interaction with a surface under interrogation. The cantilever is the beam itself, excluding the tip, that supports the tip at one end and at the other is held by the microscope apparatus. The cantilever and tip together are referred to as the probe.

The probe is generally fabricated from silicon or silicon nitride. Typically, the cantilever 42a is around 50-200 μm long, 20-50 μm wide and around 0.2-2 μm thick, but this size can of course be varied according to application. The shape may also be varied: typically it is rectangular or triangular with, in the latter case, the tip in the vicinity of its apex. The tip 42b is typically 5 μm at its base, 3-10 μm high and with an end radius of curvature of 2-20 nm. In use, the fine point at the end of the tip is oriented towards the sample 12. Recently, smaller dimension probes have been fabricated for use at faster imaging speeds. These probes have cantilevers around 5-20 μm long and 3-10 μm wide, with a correspondingly smaller tip.

A light source 28 is arranged to emit a light beam which is directed onto an upper surface (back) of the cantilever beam at the end at which the tip 42b is mounted. Light reflected from the back of the cantilever propagates to a position sensitive detector (PSD) 30, typically a split or quadrant photodiode (PD), which generates an output that is representative of the deflection (DFL) angle of the cantilever.

The light source 28, which is typically a laser, emits a light beam which is directed onto an upper surface of the tip end of the cantilever, and a reference beam, which is reflected from an upper surface of the stage. On reflection, these light beams propagate to a probe height detector 52, which includes an interferometer. The laser light is sufficiently coherent that an interference pattern is generated between the light reflected from the cantilever and the reference beam. This provides a measure of the path difference between the two beams and hence an indication of the instantaneous height of the back of the cantilever above the stage surface.

Figure 2:
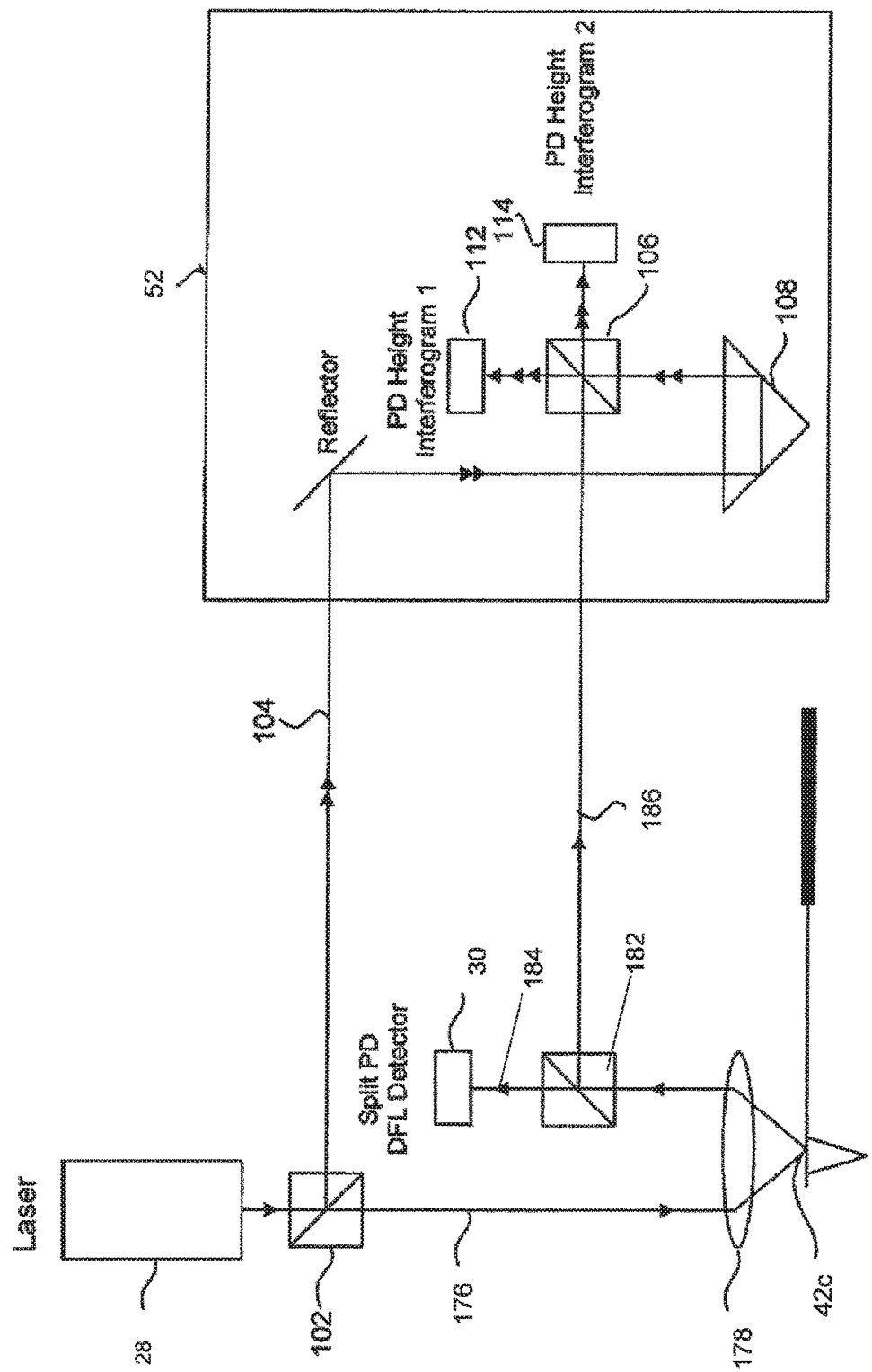
FIG. 2 is a schematic illustration showing the height detector and deflection detector in more detail.

FIG. 2 shows the PSD 30 and height detector 52 in further detail. Light from the source 28 is split by a beam splitter 102 into an incident beam 176 and a reference beam 104. The incident beam 176 is focused by an objective lens 178 onto the back 42c of the cantilever. After reflection from the cantilever, the reflected beam is split by a first beam splitter 182. A first component 184 is directed to the deflection detector 30 and a second component 186 to the height detector 52.

Inside the interferometer height detector 52, the beam 186 that has been reflected from the cantilever is split by a beam splitter 106. The reference beam 104 is directed onto a suitably positioned retro-reflector 108 and thereafter to the beam splitter 106. The retro-reflector 108 is aligned such that it provides a fixed optical path length relative to the vertical (z) position of the sample. The beam splitter 106 has an energy absorbing coating and splits both incident 186 and reference 104 beams to produce first and second interferograms with a relative phase shift of 90 degrees. The two interferograms are detected respectively at first 112 and second 114 photodetectors.

Ideally, the photodetector signals are complementary sine and cosine signals with a phase difference of 90 degrees. Further, they should have no dc offset, have equal amplitudes and only depend on the position of the cantilever and wavelength of the laser 28. Known methods are used to monitor the photodetector 112, 114 outputs while changing the optical path difference in order to determine and to apply corrections for errors arising as a result of the two photodetector signals not being perfectly harmonic, with equal amplitude and in phase quadrature. Similarly, dc offset levels are also corrected in accordance with method known in the art.

These photodetector signals are suitable for use with a conventional interferometer reversible fringe counting apparatus and fringe subdividing apparatus, which may be provided as dedicated hardware or as a programmed computer.

Phase quadrature fringe counting apparatus is capable of measuring displacements in the position of the cantilever to an accuracy of λ/8. That is, to 66 nm for 532 nm light. Known fringe subdividing techniques, based on the arc tangent of the signals, permit an improvement in accuracy to the nanometer scale or less.

Interferometric methods of extracting the path difference between two coherent beams are well known in the art and so will not be described in any further detail.

In the embodiment described above, the reference beam 104 is arranged to have a fixed optical path length relative to the z position of the sample. It could accordingly be reflected from the surface of the stage 12 on which the sample 14 is mounted or from a retro-reflector whose position is linked to that of the stage 12. The reference path length may be greater than or smaller than the length of the path followed by the beam reflected from the probe. Alternatively, the relationship between reflector and sample z position does not have to be fixed. In such an embodiment the reference beam may be reflected from a fixed point, the fixed point having a known (but varying) relationship with the z position of the sample. The height of the tip is therefore deduced from the interferometically measured path difference and the z position of the sample with respect to the fixed point.

The interferometer described herein is one example of a homodyne system. The particular system described offers a number of advantages to this application. The use of two phase quadrature interferograms enables the measurement of cantilever displacement over multiple fringes, and hence over a large displacement range. The use of a phase-shifting coating on the beamsplitter 106 renders the interferometer insensitive to polarisation effects, for example arising from changes in polarisation as the light beam is reflected from the cantilever. Examples of an interferometer based on these principles are described in U.S. Pat. No. 6,678,056 and WO2010/067129. Alternative interferometer systems capable of measuring a change in optical path length may also be employed with this invention. A suitable homodyne polarisation interferometer is described in EP 1 892 727 and a suitable heterodyne interferometer is described in U.S. Pat. No. 5,144,150.

The height information extracted by the detection system represents the true instantaneous height of the probe in the z direction. This is independent of the position of the base of the probe relative to the tip i.e. of the deflection. Accordingly, although the deflection (or other feedback parameter) is permitted to vary about its average value during the course of a scan, this is separate to the height measurement by interferometry.

Returning back to FIG. 1—probe cyclic motion is generated by a signal generator 54 which controls an illuminator 46 that directs light with an intensity variation set by the generator 54 onto the thermal bimorph cantilever 42. The result of the differing thermal expansion of the bimorph materials is a flexural cyclic movement of the probe in an essentially vertical (z) direction towards and away from the sample.

Probe cyclic motion is set at a frequency that is lower than the resonant frequency of the cantilever. It may be periodic or aperiodic, provided that it repeatedly brings the tip towards and then away from the sample surface. In other words, the cycles of the back and forth motion of the tip may be spaced apart in time by a constant time period, or they may be spaced apart by a time period which is not constant—for instance in order to sample different points spaced apart irregular intervals across the surface of the sample rather than sampling a regularly spaced grid of pixels.

In this embodiment, illumination of a thermal bimorph probe provides the drive mechanism to move the probe. Alternative drive mechanisms are also suitable for this purpose: for example, a piezoelectric actuator integrated into the cantilever or mounted at the base of the probe, actuation via a magnetic or electric field with a suitably adapted probe, or actuation using acoustic excitation, or other methods of heating the thermal bimorph such as resistive, inductive, microwave heating or irradiation heating.

During the course of a measurement the probe is cycled by the illuminator 46 and moved towards the sample surface until the surface is detected, at which point the probe is retracted and the height recorded at the point of surface detection. An image of the surface height is then created by repeating this process while moving the probe under control of the x,y drivers 24, generally following a raster pattern although any x,y sequence could be followed. The z positioning system 18 controls the height of the base of the probe above the surface and is operated to maintain the probe cyclic amplitude at a set average level, where the "probe cyclic amplitude" is the height difference for each cycle between the fully retracted position and the point of surface detection. Furthermore the z positioning system 18 has a range well in excess of the probe cyclic motion, thus allowing sample tilt and gross features to be accommodated.

The signal obtained from the height detector 52 is, in this microscope 50, subject to two analytical calculations. A field programmable gate array (FPGA) is configured in order to provide the necessary processing capability. As is known in the art, alternative signal processing techniques such as digital signal processing (DSP) or a dedicated analogue or digital electronic method may be used. In a microscope set up in accordance with this invention, the probe cyclic motion typically has a frequency range of 10's to 100's of kHz and sampling frequency for data recording is in the region of 100 MHz. Consequently, each cycle of probe movement is sampled in the region of 1000 to 10,000 times, which is more than sufficient to analyse the height detector signal to obtain the information required. The two analytical calculations may be carried out within a single FPGA but, for clarity, are illustrated in FIG. 1 as being performed by separate processing units.

A probe cyclic amplitude processing unit 56 is used to extract data for use in the z position adjustment system of the microscope. The amplitude of the probe cycles in the height signal can be extracted and used as the parameter on which to determine the z adjustments. The output from the amplitude processing unit 56 is input to a controller 58, which instructs adjustment of the z position drive 18, which in turn moves the base of the probe, to return the amplitude of probe cycle to its set point. Unlike in conventional AFMs, the set point value may not be established for each pixel position. The z adjustment parameter may be extracted during each probe cycle, but the null position need not be reached before the next measurement is extracted. In fact, at fast scan speeds such adjustment between successive measurement points may be not possible. The average amplitude value at which the probe motion is maintained is typically derived over multiple probe measurement cycles. It should be emphasised here that the operation of the z position adjustment system is quite different from conventional AFM where it is integral to image formation. Z position adjustment is only employed to ensure that adaptive drive can be operated within it's optimal range for a given size of cantilever and probe and for certain flat specimens with low tilt or small height variations the z position adjustment may not be required.

A surface detection unit 60 performs the second analytical calculation, which provides an indication of the point in the cycle at which the probe tip interacts with the sample surface. In a first embodiment of the invention, the probe velocity, or equivalently rate of change of the height signal, will fall as the tip encounters and begins to interact with the surface. An indication of the surface position is therefore extracted from the point within each cycle at which its rate of change falls below a threshold level for a set period of time.

The output of the surface detection unit 60 is the height of the probe at which it interacts with the surface within each period of a probe cycle. That is, it provides a measure of surface height at the probe's x,y position that can be used to construct an image. Each data point, representing a measured surface height, is output to the scan controller/image processor 26. This measurement is mapped to the scan x,y position within the image processor 26 and so forms a point or pixel on the image.

Once the point of surface detection is determined, the surface detection unit 60 sends a trigger signal to the signal generator 54. In response, the signal generator 54 modifies the signal sent to the illuminator 46 in order to retract the tip away from the sample. The benefit of this approach is that, by retracting the probe once the sample surface is detected, the interaction force between probe and sample is precisely controlled at all points within a measurement cycle, unlike in conventional AFM dynamic modes of operation. In the first embodiment of the invention, the maximum force is essentially set by the period of time that the rate of change in height is permitted to be below a threshold before the trigger to retract.

Clearly the deflection detector 30 is not necessary and can be removed from the microscope system if, as described above, all required data values are extracted from the height signal.

Figure 3:
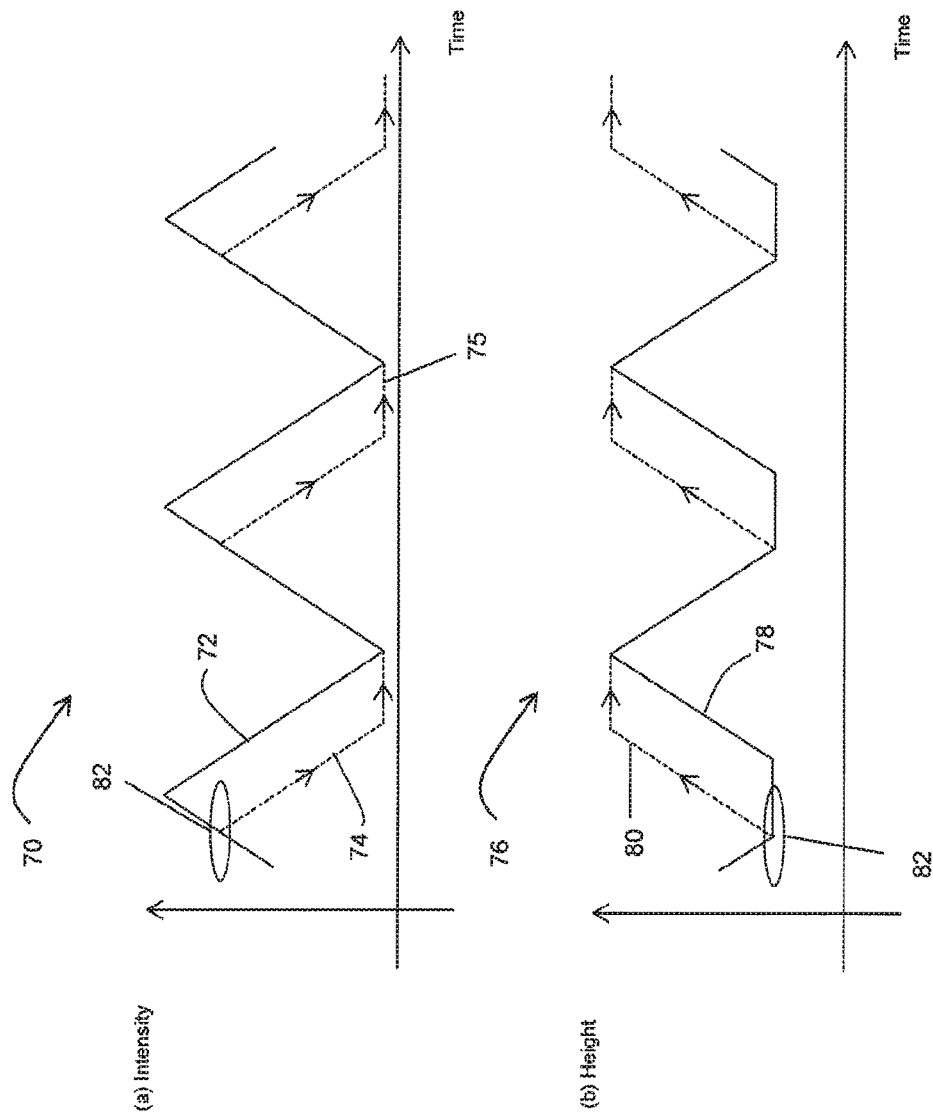

The effect and behaviour of the adaptive drive system is considered further in relation to FIG. 3. A graph 70 of illuminator intensity variation over time is shown in FIG. 3(a). The solid line 72 represents the situation without adaptive drive and the dotted line 74 shows the effect of adaptive drive. For clarity, it is assumed that the waveform generator 54 generates a signal that simply ramps up and then down in a linear manner. This signal can, of course, be any variation that will induce a corresponding variation in illumination intensity. In response to this signal, the illuminator 46 emits light whose intensity increases and decreases in a corresponding manner. This intensity variation is shown in FIG. 3(a).

As the intensity of light incident on the probe 42 is increased, the differential thermal expansion of coating (gold) and probe material (silicon nitride) causes one side of the probe to expand more than the other, which in turn causes the probe to move downwards towards the sample surface. Note that the gold coating is on the upper side of the cantilever, that is on the opposite side to the tip. For the illumination pattern shown in FIG. 3(a), the variation 76 in probe height response is shown in FIG. 3(b). The solid line 78 represents the situation without adaptive drive and the dotted line 80 shows the situation with adaptive drive.

As the signal produced by the waveform generator 54 increases, the intensity of light emitted from the illuminator 46 increases and the height of the probe tip above the sample accordingly decreases. At a point 82 in the cycle, the set period of time in which the rate of change of probe height is below a threshold value is reached and this is detected by the surface detection unit 60. A trigger signal is therefore sent to the waveform generator 54. In response, the waveform generator 54 stops increasing the magnitude of its output signal and, instead, starts to decrease it. The intensity of light emitted by the illuminator 74 starts to fall. As a result, the height of the probe starts to increase 80 and it moves away from the sample surface. Once the intensity reaches its minimum value for the cycle, the signal is maintained at this level for the remainder of the cycle. The probe will accordingly maintain its position at its cycle point furthest from the surface for the remainder of the cycle.

The difference between the situation with adaptive drive 74, 80 and without 72, 78 is apparent in FIG. 3. The point of surface detection 82 is indicated on FIG. 3(b). It can be seen that in the situation without adaptive drive 78, the height of the probe is no longer changing as the probe is in contact with the surface, however, the probe continues to be urged towards the sample with increasing force. This force may be sufficient to damage either the sample or probe. With adaptive drive, on the other hand, the motion of the probe is modified to control and prevent excessive force and surface deformation or modification.

It is not necessary to introduce a waiting period 75 during which the drive signal remains substantially constant and the probe remains retracted at the end of the modified cycle. The next period of probe oscillation could be commenced immediately once the illumination intensity reaches its minimum value. This would however have the effect of altering the drive frequency of the system between two adjacent drive pulses, which may prove destabilising. The length of the waiting period is dependent on the point of surface detection which is in turn dependent on the height of the sample. In this example the waiting period 75 is about 40% of the time period of the next pulse which immediately follows that waiting period. However if the surface detection point 82 is higher then the wait time for the next cycle would be longer as less time is spent approaching the surface.

Although alternative drive systems to the illumination drive described herein may be used to control the adaptive drive, illumination drive is very much preferred. Illumination of a thermal bimorph cantilever is a more direct route to controlling probe movement than is provided by alternative piezoelectric drives and offers improved slew rate and response time of the tip position.

A key feature of adaptive drive is the discrete and independent nature of each drive cycle. As a result, a direct benefit of adaptive drive in accordance with this invention is that it reduces the likelihood of probe or sample damage as a result of high interaction forces by offering precise control of the interaction force. A secondary benefit is that it allows for improved and more flexible surface profiling and therefore better image resolution and potentially more rapid image acquisition times. Adaptive drive is particularly advantageous when operating with high aspect ratio tips and imaging samples with rapidly changing topography, such as, the narrow line and trench features found on semiconductor devices.

An idealised representation 84 of probe motion as it encounters a step feature 86 on a sample surface 88 is shown in FIG. 4(a). The illumination intensity signal variation, with adaptive drive, is shown in FIG. 4(b) and the z actuator position adjustment is shown in FIG. 4(c). This illustration is only an example representation of probe motion. It may follow many waveforms, depending on the movement imparted to the probe and, to some extent, the interaction between probe and sample surface.

In region 88a, the probe follows a linear approach and retract path. That is, the probe approaches the surface 90a and, on detection of the surface, is retracted 90b. It is then held at is fully-retracted position 90c for the remainder of the cycle for a waiting period 100a during which the drive signal remains substantially constant. As the probe reaches the step 86 in region 88b, the probe encounters the surface 88 at a point earlier in its cycle. Illumination intensity is reduced (FIG. 4(b)) and the probe is therefore retracted sooner and held for a longer waiting period 100b than previously. Note that the waiting period 100b is increased relative to the previous waiting period 100a so that the total time period T between the start of each drive pulse remains substantially constant. Note also that the time period of each waiting period 100a, 100b is greater than or equal to the time period of the next drive pulse which immediately follows that waiting period. At the same time, the z adjustment system has detected a change in amplitude of the cycle, and the z position driver begins to respond. In order to maintain average probe height above the surface 88, the base of the probe begins to lift and total probe height is increased. As the z position driver adjusts to its new base position over two or more cycles (see FIG. 4(c)), the cycle amplitude of the probe increases until 88c the original waveform is regained. A similar effect is observed at the end of the step 86. The surface is not detected until some time later in the cycle 88d and a more intense illumination signal is allowed to develop. On detection of the surface, the intensity is reduced and the probe retracted away from this new surface level. The increase in amplitude of the cycle is detected and, over a number of cycles, the z adjustment system acts to lower the base to return the probe to its set point motion amplitude.

The free-space amplitude of the drive signal is illustrated in FIG. 4(b) for a single cycle only in dashed lines at 100c. That is, in the absence of a sample the drive signal would have followed this un-modified free-space waveform 100c. The free-space motion of the probe is illustrated in FIG. 4(b) for a single cycle only in dashed lines at 90d. That is, if the surface position had not been detected then the probe would have followed this un-modified path 90d with a free-space amplitude 90e which is chosen to be about twice the maximum height variation of the surface, so as the probe moves down from the step 86 it can be driven down sufficiently far, and also so the probe can be driven into a trench which is as deep as the step 86 is high. The free-space amplitude is typically set to be 10 s to 100 s of nanometers but will depend on the topography of the sample. Note that the free-space waveform has no wait period between each adjacent cycle.

The separation of the probe and sample can be adjusted such that the amplitude 90f is about half the free-space amplitude 90e. Alternatively the separation of the probe and sample can be adjusted such that the point of surface detection occurs at half the free-space amplitude 90e—for a linear approach ramp as in FIG. 4 this is at half the magnitude of the free-space ramp.

The image of the sample compiled by the image processor 26 comprises a plurality of pixels, each pixel of image data being derived from data sampled from the position signal during only a single cycle of the motion of the probe towards and away from the sample. A single pixel may be generated for each and every cycle as shown in FIG. 4(a). Alternatively the pixels may be generated at a lower rate, for instance every other cycle or every third sample (but still based on data sampled from the position signal during only a single cycle of the motion of the probe—the most recent cycle). In general the cyclic motion may be varied and synchronised with the desired pixel collection rate.

It will be apparent to one skilled in the art that a number of variations to the embodiment illustrated in FIG. 1 may be introduced. For example, z position adjustment may be based on the output of the deflection detector 30, rather than the height detector 52. In addition, both adaptive drive and z position adjustment systems could be implemented with the illuminator and bimorph drive, which renders the piezoelectric z drivers 18 redundant. That is, all adjustment may be implemented using the bimorph system, which potentially enables an increase in the response time of the z adjustment system. Nor is the adaptive drive system restricted to a bimorph drive by illumination. For example alternative drivers based on piezoelectric, magnetorestrictive or electrostatic systems could be used, although in order to benefit most, the response time and slew rate of the system should be high. For example both drives could be provided by an arrangement of piezoelectric actuators, one set to move the base of the probe and the other integrated into the probe and so set to drive the tip. Or a piezoelectric actuator may drive the base and a thermal bimorph system used to drive the tip. A further alternative embodiment is that both signals drive the base of the probe with one or multiple actuators. FIGS. 5 and 6 show alternative embodiments of the invention that implement some of these variations.

FIG. 5 shows a microscope 90 incorporating adaptive drive. Equivalent components are accordingly similarly referenced and no further explanation of their function will be given here. The FIG. 5 embodiment differs from that shown in FIG. 1 in its data processing system. The signal obtained from the height detector 52 is, in this microscope 90, subject to three analytical calculations. A field programmable gate array (FPGA) is configured in order to provide the necessary processing capability. As is known in the art, alternative signal processing techniques such as digital signal processing (DSP) or a dedicated analogue or digital electronic method may be used. The three analytical calculations may be carried out within a single FPGA or DSP but, for clarity, are illustrated in FIG. 5 as being performed by separate processing units.

As for the previous embodiment, an amplitude processing unit 56 is used to extract data for use in the z position adjustment system 18 of the probe microscope. The amplitude of variations in the height signal are extracted and used as the parameter on which to base z position adjustment. In response to the output from the amplitude processing unit 56, the z position drive 18, moves the base of the probe to return the amplitude to its set point. The average value at which the probe motion is maintained is typically derived over multiple probe cycles.

In the FIG. 1 microscope configuration, image data and the trigger for adaptive drive were both derived from the output of the surface detector 60. However many alternative routes are available. The probe microscope 90 illustrated in FIG. 5 includes a separate interaction processing unit 92 to monitor the point of closest approach of the probe to the sample surface. That is, the extremal point of each cycle: either the longest or shortest path difference, depending on whether the reference path length is shorter or longer respectively than the path length of the beam reflected from the probe. The interaction processing unit 92 therefore finds the lowest height measurement for each probe cycle, and this data is output to the scan controller/image processor 26. This measurement is mapped to the scan x,y position within the image processor 26 and so forms a point on the image.

In alternative implementations of the interaction processing unit 92, other points of the height signal may also be used to provide a meaningful indicator of sample surface position. For example, the point of minimum velocity during the lower half of the cycle may be employed. When imaging a compliant surface then the probe velocity, or equivalently rate of change of the height signal, will fall as it encounters and begins to deforms the surface. In this instance a measure of sample height may therefore be extracted from the point of each height signal at which a discontinuity in the rate of change of probe height is observed.

The surface detection unit 60 performs the third analytical calculation, which provides an indication of the point in the cycle at which the probe tip detects the sample surface. Typically, the probe velocity, or equivalently rate of change of the height signal, will fall as the tip encounters and begins to deform the surface. Alternative indications as to when the surface has been detected may be used other than the velocity threshold value described above. For example, an indication of the position of the surface can be extracted from the point within each height cycle at which a discontinuity in the rate of change of probe height is observed. The position of the surface may be taken as the point of closest approach. It will be clear that this parameter may also be used by the interaction processing unit 92 in order to extract a measurement of sample surface height. If both surface detection and image extraction are based on a common observation then, as in the probe microscope shown in FIG. 1, a single processing unit will be used. Once the surface is detected, the surface detection unit 60 sends a trigger signal to the waveform generator 54. In response, the waveform generator, modifies the signal sent to the illuminator in order to retract the tip away from the sample.

FIG. 6 shows a third embodiment 94 of a microscope in accordance with this invention. The FIG. 6 embodiment differs from that shown in FIG. 1 in the mechanism used for adaptive drive. A piezoelectric actuator 96 is driven by a signal from the signal generator 54 to cycle the probe at a frequency lower than its resonance frequency. In response to the trigger from the surface detection unit 60, the signal generator 54 modifies its signal and causes the piezoelectric actuator 96 to retract the probe away from the sample surface. This embodiment may be preferred for measurements in which the design of probe necessary to interact with the sample conflicts with the requirement for coating or other integrated actuator.

In another embodiment of the invention, the probe is driven with an additional oscillatory motion. Preferably the motion has an amplitude in the order of a few to 10's of nanometers and less than the probe cyclic amplitude at a resonant frequency of a flexural or torsional mode and the surface is detected using a dynamic detection scheme as used in prior art AFM as illustrated in FIG. 7. The great advantage of resonant detection modes, as already encountered in AFM, is their high sensitivity to the measurement of forces and force gradients. Consequently, it is possible to detect the approach of the sample surface as soon as the probe begins to interact with the longer range forces, such as attractive force like Van der Waals force, above the sample, rather than the shorter range repulsive and contact forces. Under these circumstances, the probe can be controlled in such a way as to minimise the forces as the probe approaches the surface and returns, once the surface has been detected. Resonant detection modes also have the advantage that they operate at relatively high frequencies and in fact higher order modes can be selected if necessary to employ even higher frequencies of operation. The frequencies relevant to surface detection can be well separated from the typical frequencies associated with the much larger amplitude quasi-static cyclic operation of the probe. The above discussion gives some indication of the advantages to be obtained by combining AFM and related SPM detection modes with the adaptive drive technique described here, however it is not intended to limit the scope of the invention is any way. Furthermore it should be emphasised that the AFM sensing methodology used here is very different from the way AFM is employed conventionally, because in conventional AFM dynamic sensing is used as part of a feedback control loop which operates continuously and not as a threshold trigger as in this invention.

A brief description of a practical embodiment of this form of surface interaction detector is given with reference to FIG. 7. A periodic signal generator 120 provides a signal which is tuned to a flexural or torsional resonance frequency of the cantilever. This signal is applied to modulate a source of illumination, which may be the cyclic drive illuminator 46 or another laser 46a as shown in FIG. 7. The periodic illumination from the laser 46a brings about periodic photothermal stress in the cantilever, which excites a resonance of typically between 1-10 nanometers in amplitude. The adaptive drive operates in a similar way to FIG. 1. The probe is advanced towards the surface until the tip interacts with the surface, typically arising from repulsive forces but any force interaction that is present could in principle be employed. As a result a change in amplitude, phase or frequency occurs which can be detected by a surface interaction detector 122 and this signal can be monitored by the surface detector 60 as before. In this way the tip can be retracted before it encounters forces which might otherwise damage it's structure, or that of the sample. Other detection schemes for resonance detection are known in the art and can be implemented accordingly. For example, a torsional resonance could be employed, and the torsion motion of the probe monitored by the quadrant photodiode of the deflection detector 30, a signal path 121 also illustrated in FIG. 7. Finally the probe can be driven as a self-excited oscillator in which case the effect of the force gradient is to modulate the frequency of oscillation, a signal which can also be detected.

Note that the lasers 46, 46a illuminate the probe 42 at different locations along its length, the beam 57 from the laser 46 illuminating the probe towards its base and the beam 56 from the laser 46a illuminating the probe at an intermediate point between the beam 57 and the beam 55 from the height detector. The location illuminated by the beam 56 is chosen to excite a particular resonant mode of oscillation, which may be flexural (in which case the beam 56 is centred on the centre line of the probe) or torsional (in which case the beam 56 is offset to one side to induce torsion about the centre line).

Figure 4:
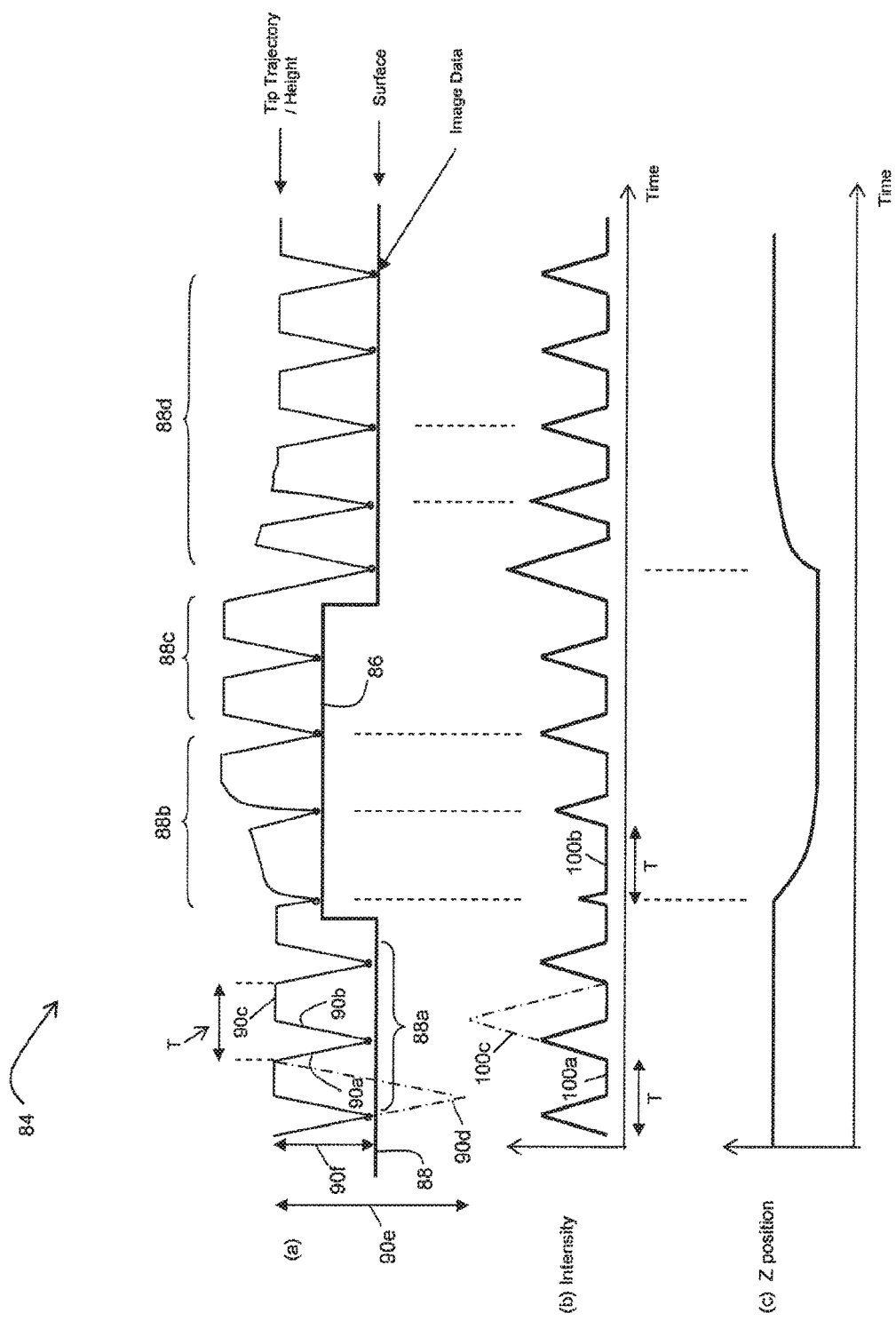
Figure 8:
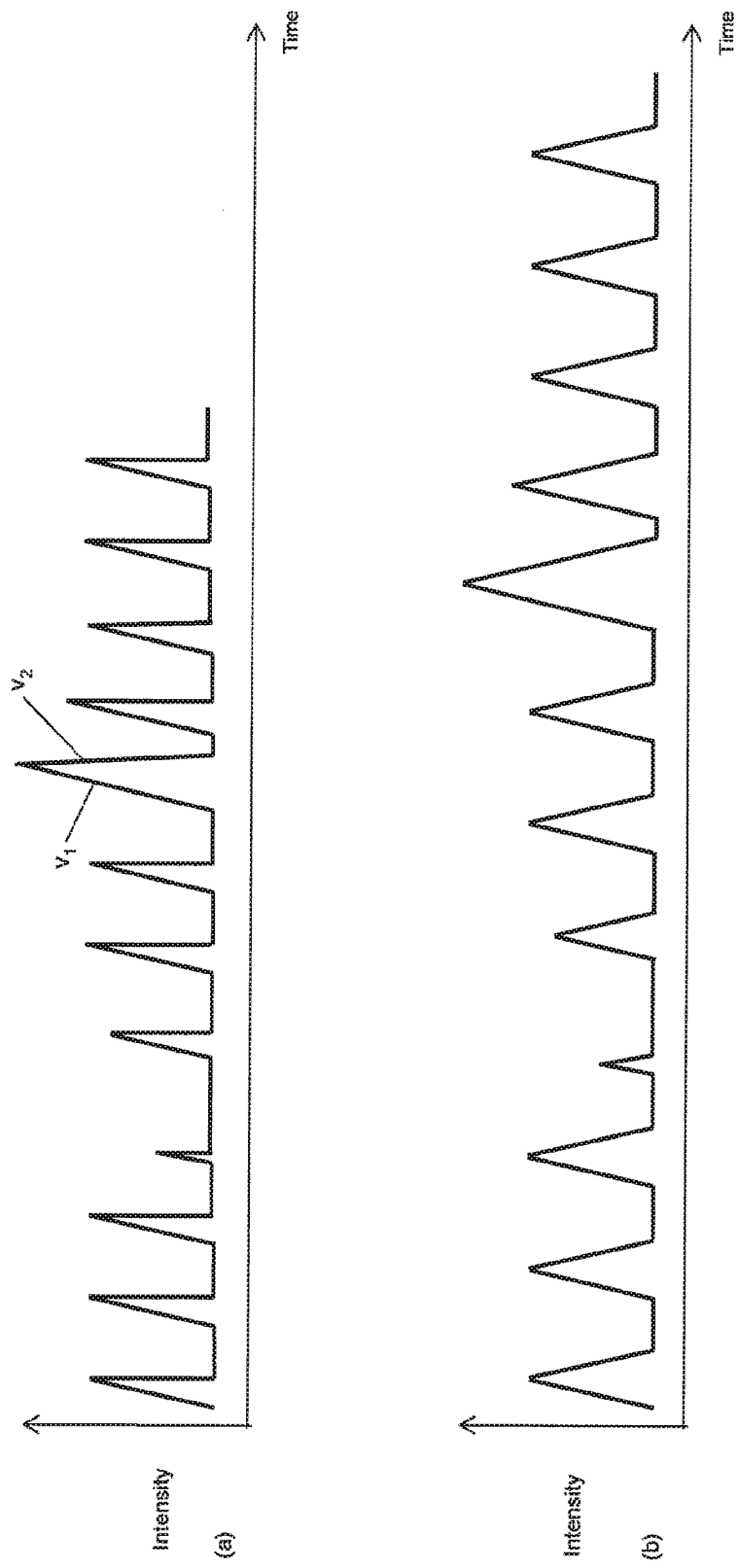

FIG. 8 shows at (b) the intensity of the drive signal from the waveform generator 54 in the case of a symmetrical drive signal as shown in FIGS. 3 and 4 above, in which the rate of approach of the probe is the same as the rate of retraction on either side of the surface position. FIG. 8 shows at (a) an alternative method in which each pulse of the drive signal is asymmetrical such as to cause the actuator 46 to move the probe towards the sample at a lower rate $v_1$ than the rate $v_2$ at which it moves away from the sample. This rapid retraction enables the sample to be imaged more quickly compared with the symmetrical pulse arrangement of FIG. 8(*b*).

FIG. 9 shows at (a) the profile of a sample with a step 130. FIG. 9(*b*) shows the intensity of the drive signal from the waveform generator 54. FIG. 9(*c*) shows the output of the height detector—i.e. the height of the probe tip relative to the stage. As mentioned above, the surface detector 60 analyses the height signal of FIG. 9(*c*) to provide an indication of the point in the cycle at which the probe tip can be considered to have made contact with the sample or be proximate the sample.

The output of the surface detection unit 60 to the image processor 26 could be the height $h_2$ of the probe at which it detects or interacts with the surface in each period of probe cycle. Alternatively, the output of the detection unit 60 to the image processor 26 could be the time $t_2$-$t_1$ which the probe takes to reach the surface position from its fully retracted position. Since the height $h_1$ of the fully retracted position and the rate of approach $v_1$ of the probe tip towards the sample are known, the height $h_2$ can be calculated as: $h_2 = h_1 - v_1(t_2 - t_1)$.

In the embodiments described above a surface detector 60 provides a measure of surface height at the probe's x,y position that is used to construct an image. Each data point, representing a measured surface height, is output to the scan controller/image processor 26. This measurement is mapped to the scan x,y position within the image processor 26 and so forms a point or pixel on the image. In an alternatively embodiment (not shown) the height signal can be monitored over a period of time during which the probe is interacting with the sample to generate elasticity data or other material data indicative of a material property of sample, and that material data output to the image processor 26.

FIG. 10 is a graph showing in solid line 140 the intensity of the drive signal for a single cycle of an alternative drive method, in accordance with an embodiment of the present invention, and in dotted line 141 the position of the probe as it responds to the drive signal. The cycle comprising an approach phase between t1 and t2 in which the intensity of the drive signal ramps in a linear fashion from an intermediate value I(int) to a maximum value (1 in the arbitrary units of FIG. 10). This heats the probe and causes it to move gradually towards the sample from a retracted position. Next there is a retract phase between t2 and t3 in which the intensity of the drive signal reduces in step-wise fashion from the maximum value to a minimum value (in this case zero) in response to the detection of the surface position 142. This causes the probe to cool and move quickly away from the sample. The intensity of the drive signal is held at the minimum value during the retract phase and then increased in step-wise fashion at the end of the retract phase back to the same intermediate value I(int).

The duration (t3–t2) of the retract phase is controlled so that the retract phase ends as soon as the probe has returned to the retracted position, and no later. This ensures that the probe returns to the same retracted position for each cycle (regardless of the surface position) and does not retract further beyond that position.

Next there is a hold phase from t3 to t4 in which the intensity of the drive signal is held at the intermediate value and the probe remains at the retracted position. The next cycle then begins at time t4 at the end of the hold phase.

There are two different ways of implementing the method of FIG. 10: a model-driven implementation and a position feedback implementation. The model-driven implementation operates as follows. Prior to imaging, cantilever thermal excitation and relaxation time constants are characterised by fitting the cantilever step response against an exponential decay function. After surface contact, the excitation is turned off and the duration (t3–t2) of the retract phase is preselected in accordance with the duration (or equivalently the maximum intensity value) of the approach phase of that cycle and the model of the cantilever. The model requires prior measurements of the excitation and relaxation time constants and is implemented using look-up tables.

The position feedback implementation operates as follows. For each cycle the interferometer continuously monitors the height of the probe as it moves away from the sample. In response to detection of the retracted position the interferometer prompts the signal generator to increase the intensity of the drive signal from zero to the intermediate value thereby ending the retract phase for that cycle.

Figure 11:
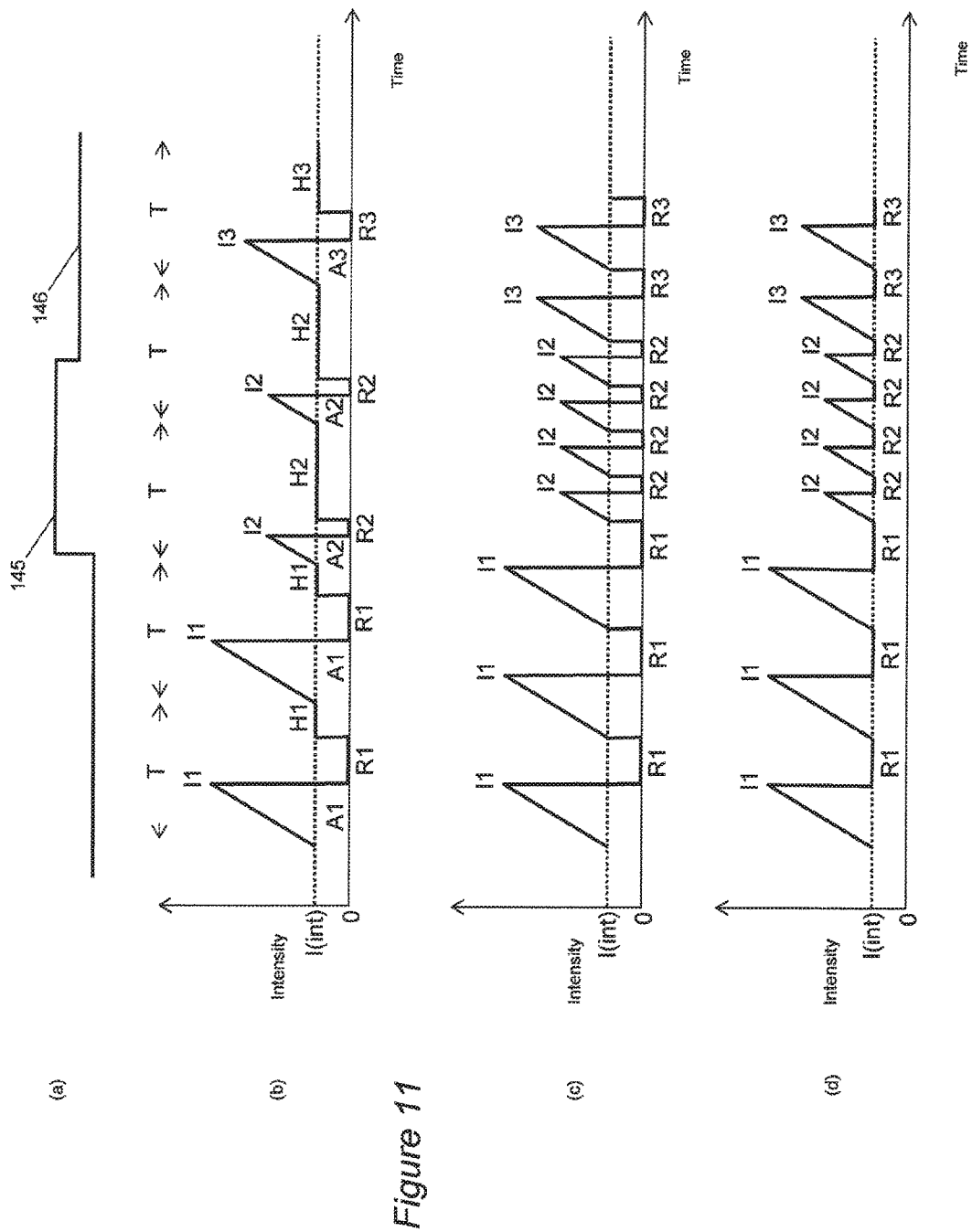

FIG. 11(*b*) shows the drive signal for a series of six cycles as the probe traverses a sample with the profile shown in FIG. 11(*a*). The first two cycles have a maximum intensity I1 and a retract phase with a duration R1. After the probe moves onto a step 145, the maximum intensity reduces so the second two cycles have a reduced maximum intensity I2 and a retract phase with a reduced duration R2. After the probe moves down from the step to an intermediate level 146, the maximum intensity increases so the last two cycles have an intermediate maximum intensity I3 (where I1>I3>I2) and a retract phase with an intermediate duration R3 (where R1>R3>R2). The approach cycles have durations A1,A2 and A3.

Thus for each cycle the duration R1,R2,R3 of the retract phase is dependent on the maximum intensity value I1,I2,I3 in the approach phase of that cycle (or equivalently it is dependent on the duration A1,A2,A3 of the approach phase which is directly proportional to the maximum intensity value). A high maximum intensity value is associated with a long retract phase and a low maximum value is associated with a short retract phase.

Each cycle also has a hold phase of duration H1,H2,H3 in which the intensity of the drive signal is held at the intermediate value I(int) and the probe remains at the retracted position. The durations H1,H2,H3 are selected so that the total duration T of each cycle does not change between cycles—in other words:

$$A1+R1+H1=A2+R2+H2=A3+R3+H3=T$$

Thus for each cycle the duration H1,H2,H3 of the hold phase is dependent on the maximum intensity value I1,I2,I3 in the approach phase of that cycle (or equivalently it is dependent on the duration of the approach phase which is directly proportional to the maximum intensity value). A high maximum intensity value is associated with a short hold phase and a low maximum value is associated with a long hold phase.

FIG. 11(*c*) shows an alternative arrangement in which there is no hold phase. In this case at the end of each retract phase the drive signal increases rapidly from zero to the intermediate value I(int) then immediately increased gradually during the approach phase, without waiting for a hold phase. An advantage of omitting the hold phase as in FIG. 11(*c*) is that a larger amount of data can be acquired during a given time period.

FIG. 11(*d*) shows a further alternative arrangement in which during the retract phase the intensity drops to I(int) rather than zero, and at the end of each retract phase the drive signal increases gradually without a sharp or step-wise jump as in FIG. 11(*c*) or a hold phase as in FIG. 11(*b*).

The advantage of reducing the intensity to zero during the retract phase as in FIGS. 11(*b*) and (*c*), rather than reducing it to a non-zero intensity I(int) as in FIG. 11(*d*), is that the probe will retract more quickly so the sample can also be imaged more quickly.

One benefit of the hold phase in FIG. 11(*b*) compared with FIGS. 11(*c*) and 11(*d*) is that the total duration T of each cycle is constant. In FIGS. 11(c) and 11(d) the total duration of each cycle changes when the maximum intensity changes—a high maximum intensity being associated with a long total cycle duration. Keeping the duration T constant avoids the problem of probe self-excitation. Another benefit of the hold phase is that it gives time to allow the probe to stop ringing, if ringing occurs at the end of the retract phase.

The invention claimed is:

1. A scanning probe microscope comprising:
   a probe that is mechanically responsive to a driving force;
   a signal generator for providing a drive signal to an actuator that generates the driving force by heating the probe, the drive signal being such as to cause the actuator to move the probe repeatedly towards and away from a sample;
   a detection system arranged to output a detection signal indicative of a position of the probe; and
   signal processing apparatus arranged to monitor the probe as the probe approaches the sample and to detect a surface position at which the probe interacts with the sample;
   wherein in response to detection of the surface position the signal processing apparatus prompts the signal generator to modify the drive signal to cause the probe to move away from the sample,
   wherein the signal generator is arranged so that the drive signal comprises a series of cycles, each cycle comprising an approach phase in which an intensity of the drive signal increases to a maximum value to heat the probe and cause the probe to move towards the sample; and a retract phase after the approach phase in which the intensity of the drive signal reduces from the maximum value to a minimum value in response to the detection of the surface position so that the probe cools and moves away from the sample,
   wherein the signal generator is further arranged so that the intensity of the drive signal is held at the minimum value during the retract phase and then increased at the end of the retract phase, and
   wherein the signal generator is further arranged so that the duration of the retract phase for each cycle is dependent on the maximum value in the approach phase of that cycle so that a high maximum value is associated with a long retract phase and a low maximum value is associated with a short retract phase.

2. A scanning probe microscope according to claim 1 in which the probe comprises two materials of differing thermal expansion and the actuator is a source of illumination.

3. A scanning probe microscope according claim 1 wherein the drive signal is such as to cause the actuator to move the probe repeatedly towards and away from the sample between a fully retracted position and a surface position, and the signal processing apparatus is also arranged to adjust a separation of the probe and sample so as to maintain the distance between the surface position and the fully retracted position at a desired value.

4. A scanning probe microscope according to claim 1 wherein the signal generator is further arranged so that for each cycle the signal generator predetermines the duration of the retract phase in accordance with the maximum value in the approach phase of that cycle.

5. A scanning probe microscope according to claim 1 wherein the signal generator is further arranged so that each cycle further comprises a hold phase after the retract phase in which the intensity of the drive signal is held at an intermediate value between the minimum value and the maximum value.

6. A scanning probe microscope according to claim 5 wherein the duration of each hold phase is dependent on the maximum intensity value in the approach phase of that cycle so that a high maximum intensity value is associated with a short hold phase and a low maximum value is associated with a long hold phase.

7. A scanning probe microscope according to claim 6 wherein the duration of each hold phase is selected so that the total duration of each cycle does not change when the maximum intensity value changes.

8. A scanning probe microscope according to claim 1 wherein the signal generator is further arranged to control the duration of the retract phase for each cycle so that the retract phase ends as soon as the probe position has returned to a retracted position, and the retracted position is the same for each cycle.

9. A scanning probe microscope according to claim 1 wherein the signal generator is further arranged so that the drive signal comprises a series of pulses and each pulse of the drive signal is asymmetrical such as to cause the actuator to move the probe towards the sample at a lower rate than it moves away from the sample.

10. A scanning probe microscope according to claim 1, wherein for each cycle the signal processing apparatus is arranged to monitor the probe as the probe moves away from the sample and to detect a retracted position, and in response to detection of the retracted position the signal processing apparatus prompts the signal generator to increase the intensity of the drive signal from the minimum value thereby ending the retract phase for that cycle.

11. A scanning probe microscope according to claim 1, wherein the detection signal is a height signal indicative of a path difference between light reflected from the probe and a height reference beam.

12. A method of examining a sample, the method comprising the steps of:
   (a) generating a drive signal that is used to control a temperature of a probe so that the probe moves repeatedly towards and away from the sample;
   (b) measuring a position of the probe to generate a detection signal;
   (c) monitoring the probe as the probe moves towards the sample to obtain an indication of a surface position at which the probe interacts with the sample; and
   (d) adjusting the drive signal in response to the indication of surface position,
   wherein the drive signal comprises a series of cycles, each cycle comprising an approach phase in which an intensity of the drive signal increases to a maximum value to heat the probe and cause it to move towards the sample; and a retract phase after the approach phase in which the intensity of the drive signal reduces from the maximum value to a minimum value in response to the indication of the surface position so that the probe cools and moves away from the sample,
   wherein the intensity of the drive signal is held at the minimum value during the retract phase and then increased at the end of the retract phase, and
   wherein the duration of the retract phase for each cycle is dependent on the maximum value in the approach phase of that cycle so that a high maximum value is associated with a long retract phase and a low maximum value is associated with a short retract phase.

13. A method according to claim 12 wherein the probe is monitored in step (c) by monitoring the detection signal.

14. A method according to claim 12 wherein the method also includes the step of correlating the detection signal with a probe lateral position in order to construct an image of the sample.

15. The method of claim 12 wherein each cycle further comprises a hold phase after the retract phase in which the intensity of the drive signal is held at an intermediate value between the minimum value and the maximum value.

16. The method of claim 15 wherein the duration of each hold phase is selected so that the total duration of each cycle does not change when the maximum intensity value changes.

17. A scanning probe microscope comprising:
a probe that is mechanically responsive to a driving force;
a signal generator for providing a drive signal to an actuator that generates the driving force by heating the probe, the drive signal being such as to cause the actuator to move the probe repeatedly towards and away from a sample;
a detection system arranged to output a detection signal indicative of a position of the probe; and
signal processing apparatus arranged to monitor the probe as the probe approaches the sample and to detect a surface position at which the probe interacts with the sample;
wherein in response to detection of the surface position the signal processing apparatus prompts the signal generator to modify the drive signal to cause the probe to move away from the sample,
wherein the signal generator is arranged so that the drive signal comprises a series of cycles, each cycle comprising an approach phase in which an intensity of the drive signal increases to a maximum value to heat the probe and cause the probe to move towards the sample; and a retract phase after the approach phase in which the intensity of the drive signal reduces from the maximum value to a minimum value in response to the detection of the surface position so that the probe cools and moves away from the sample,
wherein the signal generator is further arranged so that the intensity of the drive signal is held at the minimum value during the retract phase and then increased at the end of the retract phase, and
wherein the signal generator is further arranged so that each cycle further comprises a hold phase after the retract phase in which the intensity of the drive signal is held at an intermediate value between the minimum value and the maximum value.

18. A scanning probe microscope according to claim 17, wherein the detection signal is a height signal indicative of a path difference between light reflected from the probe and a height reference beam.

19. A method of examining a sample, the method comprising the steps of:
(a) generating a drive signal that is used to control a temperature of a probe so that the probe moves repeatedly towards and away from the sample;
(b) measuring a position of the probe to generate a detection signal;
(c) monitoring the probe as the probe moves towards the sample to obtain an indication of a surface position at which the probe interacts with the sample; and
(d) adjusting the drive signal in response to the indication of surface position,
wherein the drive signal comprises a series of cycles, each cycle comprising an approach phase in which an intensity of the drive signal increases to a maximum value to heat the probe and cause it to move towards the sample; and a retract phase after the approach phase in which the intensity of the drive signal reduces from the maximum value to a minimum value in response to the indication of the surface position so that the probe cools and moves away from the sample,
wherein the intensity of the drive signal is held at the minimum value during the retract phase and then increased at the end of the retract phase, and
wherein each cycle further comprises a hold phase after the retract phase in which the intensity of the drive signal is held at an intermediate value between the minimum value and the maximum value.

20. The method of claim 19, wherein the detection signal is a height signal indicative of a path difference between light reflected from the probe and a height reference beam.

* * * * *